United States Patent [19]
Schaarschmidt

[11] Patent Number: 5,257,940
[45] Date of Patent: Nov. 2, 1993

[54] CHILD'S EDUCATIONAL CALENDAR

[76] Inventor: Laurie A. Schaarschmidt, 1239 SW. SeaHawk Way, Palm City, Fla. 34990

[21] Appl. No.: 970,926

[22] Filed: Nov. 2, 1992

[51] Int. Cl.⁵ .......................... G09D 3/08; G09D 3/04
[52] U.S. Cl. ........................................ 434/304; 40/107; 40/110; 40/118; 434/238; 434/429
[58] Field of Search .................. 40/107, 110, 118, 460, 40/486, 488; 434/238, 394, 427, 428, 429, 430, 304; 446/901

[56] References Cited

U.S. PATENT DOCUMENTS

| | | | |
|---|---|---|---|
| 1,448,610 | 3/1923 | Weinberger | 40/460 |
| 3,099,352 | 7/1963 | Aven | 40/107 |
| 3,207,421 | 9/1965 | Hunger et al. | 40/110 X |
| 3,278,010 | 10/1966 | Katz | 40/107 |
| 4,058,916 | 11/1977 | Whyatt | 40/110 X |
| 4,176,478 | 12/1979 | Brewer | 40/107 |
| 4,819,352 | 4/1989 | Maunand | 40/110 X |
| 4,905,388 | 3/1990 | Sinkow | 40/110 |
| 4,975,061 | 12/1990 | Avrill | 434/304 |
| 5,135,260 | 8/1992 | Irlik et al. | 40/107 X |

*Primary Examiner*—Cary E. O'Connor
*Assistant Examiner*—L. Thomas
*Attorney, Agent, or Firm*—Leon Gilden

[57] ABSTRACT

An educational calendar includes a base web formed of a fibrous material arranged to include a first base to removably mount a monthly indicator plate, with a plurality of rows and columns of date spaces, with each column of date spaces having a date designation mounted to each of the seven columns. The date plates mounted upon the date spaces are of contrasting coloration and configurations for the education and amusement of children and the like. A modified date plate structure is arranged to include a tablet dispensing pocket for use by children.

2 Claims, 4 Drawing Sheets

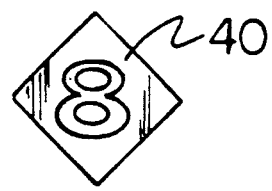 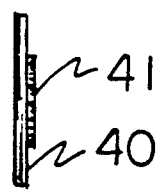 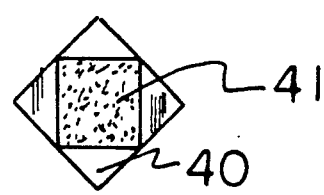
FIG 9     FIG 10     FIG 11
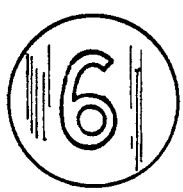  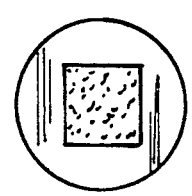
FIG 12     FIG 13     FIG 14
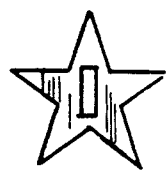  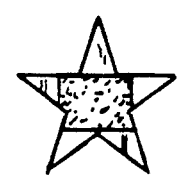
FIG 15     FIG 16     FIG 17
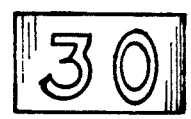  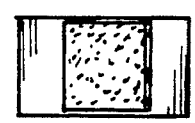
FIG 18     FIG 19     FIG 20
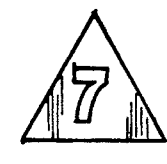  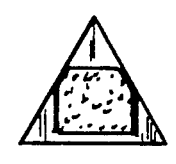
FIG 21     FIG 22     FIG 23
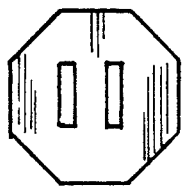  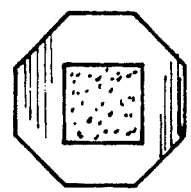
FIG 24     FIG 25     FIG 26

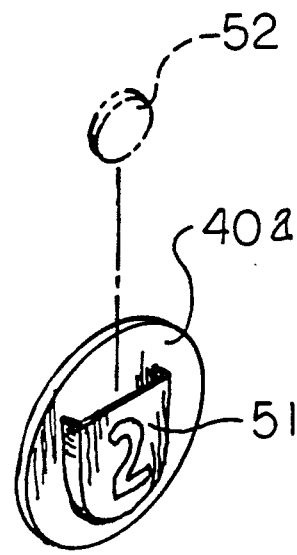
FIG 27
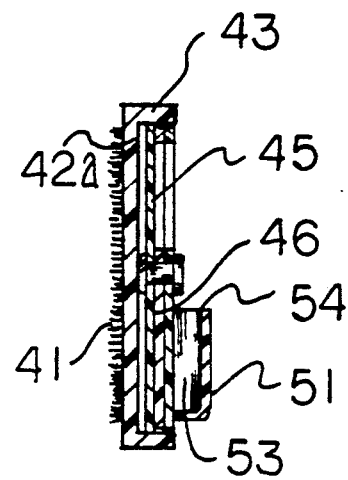
FIG 30
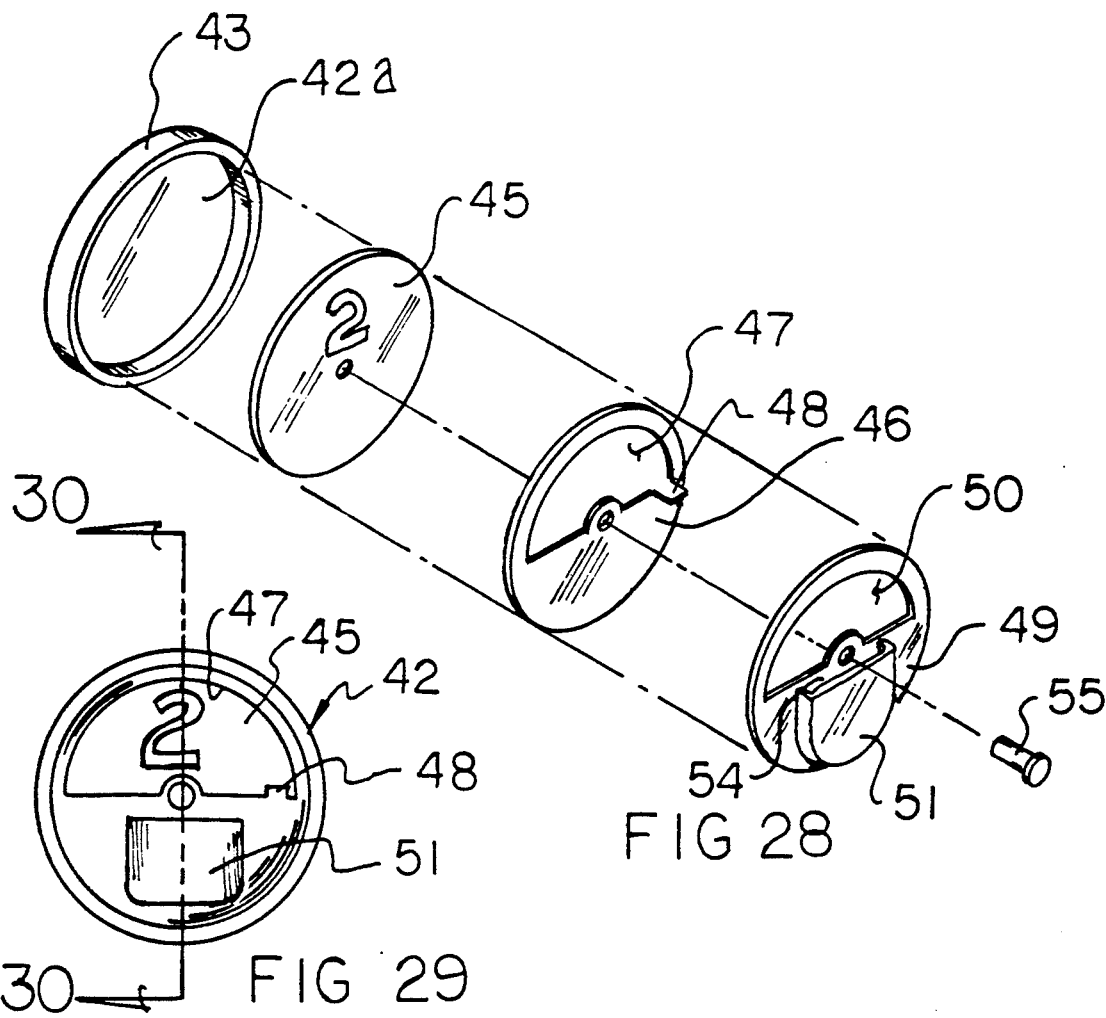
FIG 28
FIG 29

CHILD'S EDUCATIONAL CALENDAR

BACKGROUND OF THE INVENTION

1. Field of the Invention

The field of invention relates to calendar apparatus, and more particularly pertains to a new and improved child's educational calendar wherein the same is arranged to direct the entertainment, amusement, and understanding of children of the various date sequences relative to a calendar structure.

2. Description of the Prior Art

Educational calendar structure of various types have been utilized in the prior art and exemplified by the U.S. Pat. Nos. 4,975,061 to Avrill and 4,863,386 to Maxey, wherein the calendar structure is arranged to include various pockets relative to a calendar structure.

U.S. Pat. No. 4,852,282 to Selman sets forth a magnetic calendar framework mounted to an appliance.

Accordingly, it may be appreciated there continues to be a need for a new and improved child's educational calendar as set forth by the instant invention which addresses both the problems of ease of use as well as effectiveness in construction in providing for the ease of mounting and removal of various date plates relative to an individual mounting calendar web and in this respect, the present invention substantially fulfills this need.

SUMMARY OF THE INVENTION

In view of the foregoing disadvantages inherent in the known types of child's educational calendar now present in the prior art, the present invention provides a child's educational calendar utilizing removable and contrastingly configured and colored date plates to provide for entertainment, amusement, and the understanding of children relative to date sequencing. As such, the general purpose of the present invention, which will be described subsequently in greater detail, is to provide a new and improved child's educational calendar which has all the advantages of the prior art child's educational calendars and none of the disadvantages.

To attain this, the present invention provides an educational calendar including a base web formed of a fibrous material arranged to include a first base to removably mount a monthly indicator plate, with a plurality of rows and columns of date spaces, with each column of date spaces having a date designation mounted to each of the seven columns. The date plates mounted upon the date spaces are of contrasting coloration and configurations for the education and amusement of children and the like. A modified date plate structure is arranged to include a tablet dispensing pocket for use by children.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child's educational calendar which has all the advantages of the prior art child's educational calendars and none of the disadvantages.

It is another object of the present invention to provide a new and improved child's educational calendar which may be easily and efficiently manufactured and marketed.

It is a further object of the present invention to provide a new and improved child's educational calendar which is of a durable and reliable construction.

An even further object of the present invention is to provide a new and improved child's educational calendar which is susceptible of a low cost of manufacture with regard to both materials and labor, and which accordingly is then susceptible of low prices of sale to the consuming public, thereby making such child's educational calendar economically available to the buying public.

Still yet another object of the present invention is to provide a new and improved child's educational calendar which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

Figures 1, 2:
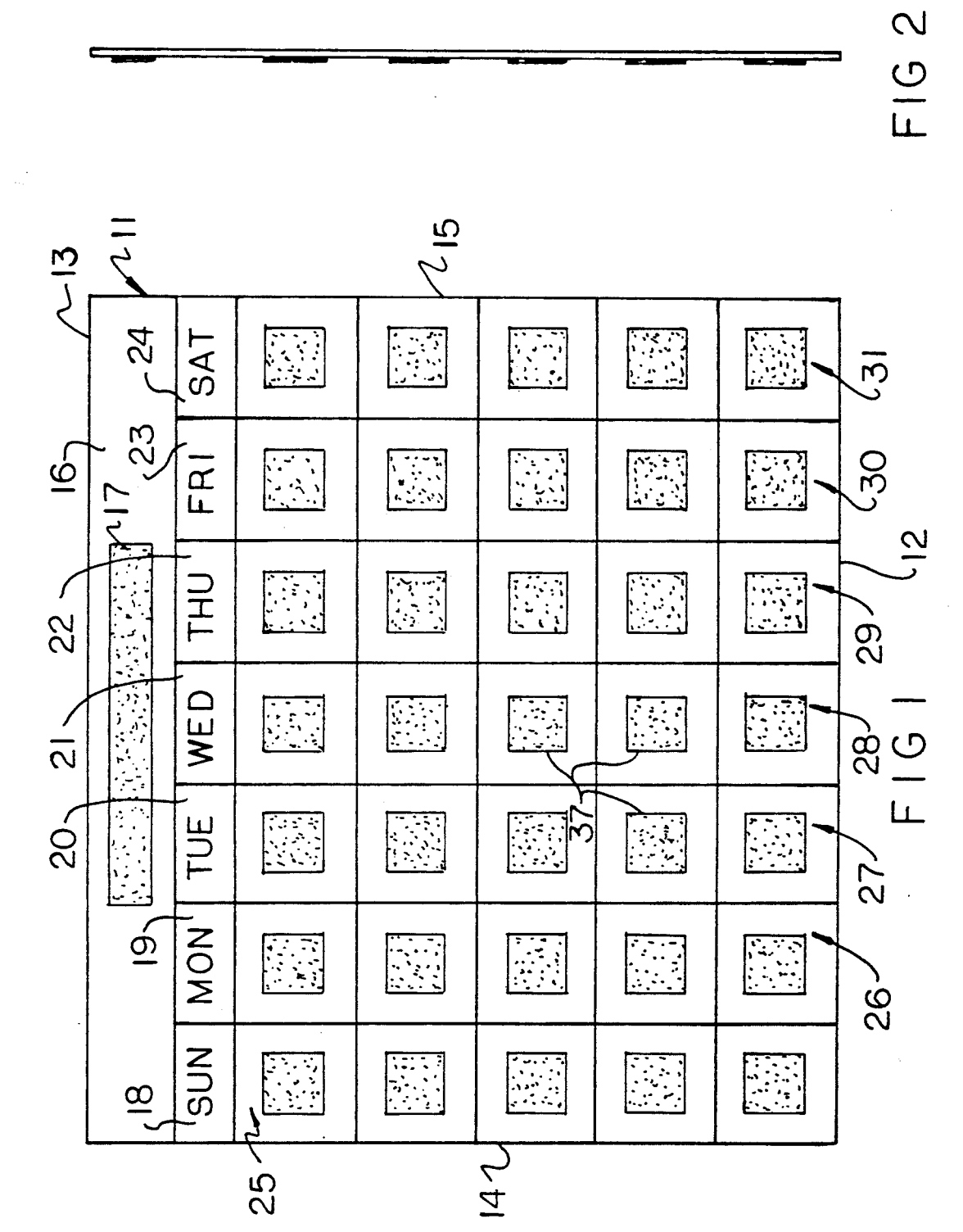

FIG. 1 is an orthographic view of the fibrous base web utilized by the invention.

FIG. 2 is an orthographic end view of the base web, as indicated in FIG. 1.

FIGS. 6, 9, 12, 15, 18, 21, and 24 are orthographic frontal views of date plate utilized for mounting upon the base web.

FIGS. 7, 10, 13, 16, 19, 22, and 25 are orthographic side views of the date plates as indicated in the respective FIGS. 6, 9, 12, 15, 18, 21, and 24.

FIGS. 8, 11, 14, 17, 20, 23, and 26 are orthographic rear views of the date plates of the respective FIGS. 6, 9, 12, 15, 18, 21, and 24.

FIG. 27 is an isometric illustration of a modified date plate structure.

FIG. 28 is an isometric view of a further modified date plate structure.

FIG. 29 is an orthographic frontal view of the date plate structure as indicated in FIG. 28.

FIG. 30 is an orthographic view, taken along the lines 30—30 of FIG. 29 in the direction indicated by the arrows.

DESCRIPTION OF THE PREFERRED EMBODIMENT

Figure 3:
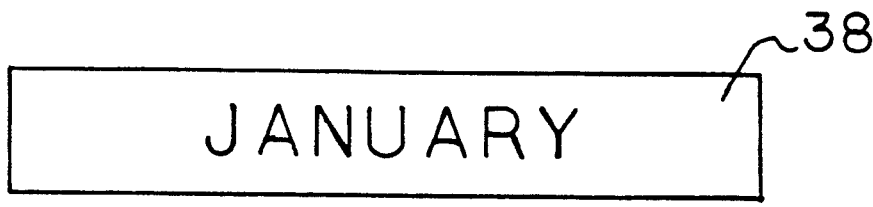
FIG. 3 is an orthographic view of the monthly plate structure utilized by the invention.

With reference now to the drawings, and in particular to FIGS. 1 to 30 thereof, a new and improved child's educational calendar embodying the principles and concepts of the present invention and generally designated by the reference numerals 11-55 will be described.

More specifically, the child's educational calendar of the instant invention essentially comprises a fibrous base web 11. The web may be formed of any flexible or rigid material and is typically formed of a fibrous web material such as velour. The web includes a first side 12 oriented as a lowermost side, with a parallel second side 13 spaced from the first side 12 oriented at an uppermost side. First and second ends 14 and 15 respectively are disposed at opposed end portions of the first and second sides, and typically in an orthogonal relationship. It may be understood that while the structure is indicated in a rectangular configuration, any convenient geometrical configuration may be employed to contain the contents of the structure disclosed herein.

Figure 4:
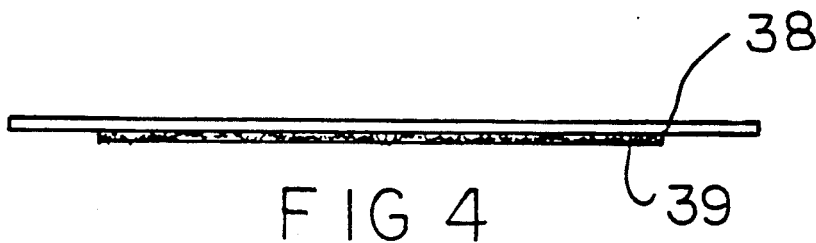
FIG. 4 is an orthographic top view of the plate structure as indicated in FIG. 3.
Figure 5:
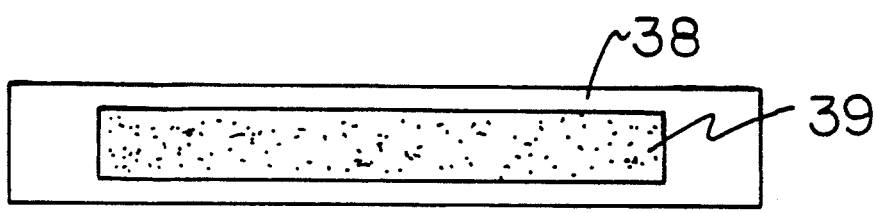
FIG. 5 is an orthographic rear view of the plate structure as indicated in FIG. 3.
Figure 6:
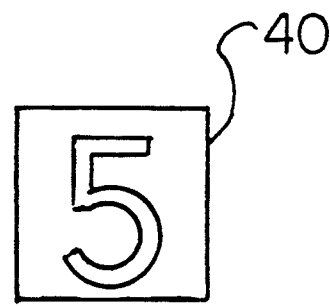
Figure 7:
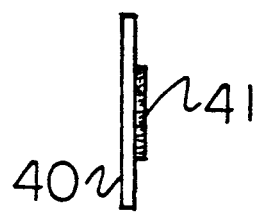
Figure 8:
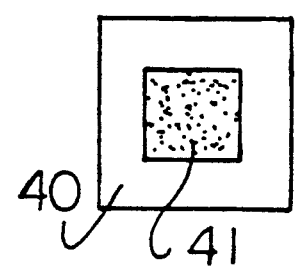

A first space 16 is oriented on the base web 11 to a top surface thereof that is adjacent to and coextensive with the second side 13. The first space 16 includes a mounting plate 17 medially thereof typically formed, if required, of a hook and loop fastener first surface first surface. A first, second, third, fourth, fifth, sixth, and seventh column of date spaces 25, 26, 27, 28, 29, 30, and 31 respectively are provided, wherein the total of each of the individual spaces totals at least 31, and wherein as indicated is presented as 35 to accommodate the ending of each month at different orientations within the lowermost row of spaces. In this manner, five rows of spaces are provided orthogonally directed between the first and second ends 14 and 15 of the first through seventh columns. An uppermost row includes respective first, second, third, fourth, fifth, sixth, and seventh column day spaces 18, 19, 20, 21, 22, 23, and 24 respectively of the various days of the week at an uppermost end of each of the columns of date spaces 25-31. The columns of date spaces 25-31 are parallel relative to one another and parallel between the first and second ends 14 and 15. The date spaces 25-31 of the columns are arranged to include each a date space hook and loop fastener surface 37 if such is required in addition to a cooperative velour or fibrous surface to each date space accommodating and selectively securing thereto a date plate 40, of a type as indicated in the FIGS. 6-26, with each date plate having a data plate hook and loop fastener patch 41 mounted to a rear surface thereof, with the forward surface having a numerical date to include indications 1-31. The numbers are arranged upon the base web 11 in accordance with a desired month. A monthly plate 38, such as the type as indicated in FIGS. 3-5, includes a monthly plate hook and loop fastener surface 39 to a rear surface thereof for selective fastening to the mounting plate 17. In this manner, the same base web 11 is employed for each of the twelve months and merely the data plate is changed. It should be also noted that the date plates are of various geometric configurations, and it is desired that each be of a contrasting coloration for the enhanced amusement and entertainment of individuals such as children to enhance their aptitude and desire for attention in learning of the monthly dating organizations of each of the calendar months.

The FIG. 27 indicates a modified date plate structure 40a having, in addition to the organizational structure as illustrated in the FIGS. 6-26, a pocket 51 mounted to a forward surface thereof to accommodate a vitamin tablet 52 or other medication required at predetermined intervals by a child. In this manner, the child is encouraged, such as in the consumption of vitamins, to associate the medicant or vitamin of the predetermined date and become self-sufficient in the consumption of such teaching responsibility and independence in this manner.

A further modified date plate structure 42 is indicated in the FIGS. 28-30. The date plate structure 42 includes a plate annular skirt 43 concentrically mounted about a date plate flange 42a. A date disc 45 is received within the skirt 43 onto the flange 42a to accommodate individual dates. In this manner, only those dates requiring the dispensing of a vitamin tablet 52 and the like from the pocket 51 is provided in the modified date plate structure 42 upon the base web 11. A window disc 46 is superimposed upon the date disc 45, with the window disc 46 and a window opening 47 to provide for viewing access to the date disc 45 and the indicated date thereon. A handle flange 48 is mounted to the window disc 46 in adjacency to the window opening 47 and orthogonally projecting from the date disc 45. An extension disc 49 is subsequently surmounted upon the window disc 46, with the date disc, the window disc, and the extension disc 49 received within the skirt 43 of the modified date plate structure 42 and upon the date plate flange 42a. The handle flange 48 projects through an extension disc opening 50 permitting rotation of the window disc 46 between the date disc 45 and the exterior disc 49. The handle flange 48 is mounted in a spaced relationship relative to the axial center of the window disc 46 to permit its rotation within the exterior disc opening 50. The pocket 51 includes a pocket cavity 53, as indicated in the FIG. 30 for example, having a cavity entrance opening 54 to receive and permit dispensing of the vitamin tablet and the like therefrom. An axle 55 is coaxially mounted relative to and through the exterior disc 49, the window disc 46, the date disc 45, and fixedly secured onto the date plate flange 42a concentrically of the annular skirt 43. In this manner, upon removal of the vitamin from the pocket 51, the handle flange 48 is rotated to cover the data disc 45 enumeration to indicate that the vitamin or medicant has been consumed.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A child's educational calendar, comprising,
a base web, the base web having a first side at lowermost edge of the base web, spaced from a second side at an uppermost edge of the base web, and a first end spaced from a second end, with the base web having a first space adjacent to and coextensive with the second side, and the first space including a mounting plate space, the mounting plate space including a first space hook and loop fastener surface thereon, and
at least one monthly plate arranged for selective securement to the mounting plate space, and
the monthly plate including a monthly plate rear surface, with the monthly plate rear surface having a second hook and loop fastener surface thereon for selective securement to the first hook and loop fastener surface, and
a first row of day spaces directed coextensively and in adjacency to the first space, wherein the day spaces include a first, second, third, fourth, fifth, sixth, and seventh day space corresponding with each consecutive weekly day, and
below each weekly day the base web having a column of date spaces, to include a first, second, third, fourth, fifth, sixth, and seventh column of date spaces, with each column of date spaces including a plurality of date spaces, wherein the date spaces total at least thirty-one date spaces, and
a plurality of date plates equaling at least thirty-one, wherein the date plates are of contrasting configurations and colorations, and each date plate includes a date plate rear surface, and each date plate rear surface includes a hook and loop fastener patch positioned thereon for securement to the base web within each respective date space, and
each date plate includes a pocket member for accommodating and permitting dispensing of a tablet therefrom, and
each date plate includes a date plate flange and an annular skirt orthogonally mounted to the date plate flange peripherally thereof and concentrically relative to the date plate flange, and a date disc received within the skirt on the date plate flange, and a window disc received on the date disc within the skirt, and the window disc having a window disc opening, and the window disc including a handle flange mounted to the window disc in adjacency to the opening adjacent a periphery of the window disc, and an exterior disc, the exterior disc having an exterior disc opening, and the handle flange projecting through the exterior disc opening permitting rotation of the window disc within the exterior disc opening, and the pocket member mounted onto the exterior disc, with the pocket member having a pocket cavity and a pocket cavity entrance opening in adjacency to and below the window disc opening.

2. A child's educational calendar as set forth in claim 1 including an axle mounted to the date plate flange and coaxially directed through the date disc, the window disc, and the exterior disc to rotatably mount the window disc relative to the date disc within the exterior disc opening.

* * * * *